United States Patent [19]
Yoshida et al.

[11] Patent Number: 5,216,705
[45] Date of Patent: Jun. 1, 1993

[54] DATA COMMUNICATION APPARATUS WITH AN ABBREVIATED DIAL KEY HAVING A PLURALITY OF DIAL DATA AND CAPABLE OF SELECTING ONE OF TWO COMMUNICATION FUNCTIONS

[75] Inventors: Takehiro Yoshida; Makoto Kobayashi, both of Tokyo; Takeshi Ono, Kanagawa; Satoshi Wada, Kanagawa; Tomoyuki Takeda, Kanagawa, all of Japan

[73] Assignee: Canon Kabushiki Kaisha, Tokyo, Japan

[21] Appl. No.: 823,054

[22] Filed: Jan. 17, 1992

Related U.S. Application Data

[63] Continuation of Ser. No. 550,953, Jul. 11, 1990, abandoned.

[30] Foreign Application Priority Data

Jul. 12, 1989 [JP] Japan .................... 1-177972

[51] Int. Cl.⁵ .................... H04M 11/00; H04N 1/00
[52] U.S. Cl. .................... 379/100; 379/356; 358/440
[58] Field of Search ............ 379/100, 354–356, 379/97, 216; 358/434–436, 402, 438, 440

[56] References Cited

U.S. PATENT DOCUMENTS

| | | | |
|---|---|---|---|
| 4,567,326 | 1/1986 | Sato et al. | 379/355 |
| 4,661,976 | 4/1987 | Basch | 379/355 |
| 4,741,021 | 4/1988 | Kotani et al. | 379/100 |
| 4,764,951 | 8/1988 | Kotani et al. | 379/100 |
| 4,833,705 | 5/1989 | Kobayashi | 379/100 |
| 4,870,503 | 9/1989 | Miura | 379/100 |
| 4,878,123 | 10/1987 | Miura et al. | 379/100 |
| 4,908,853 | 3/1990 | Matsumoto | 379/354 |
| 4,910,506 | 3/1990 | Yoshida et al. | 358/400 |

FOREIGN PATENT DOCUMENTS

| | | | |
|---|---|---|---|
| 0316883 | 5/1989 | European Pat. Off. | 379/100 |
| 0360200 | 3/1990 | European Pat. Off. | 379/100 |
| 0203777 | 9/1986 | Japan | 379/100 |

*Primary Examiner*—Curtis Kuntz
*Assistant Examiner*—Wing F. Chan
*Attorney, Agent, or Firm*—Fitzpatrick, Cella, Harper & Scinto

[57] ABSTRACT

A communication apparatus includes an abbreviated dial key, a memory for storing a plurality of dial data in correspondence with the abbreviated dial key, a control circuit responsive to a key input of the abbreviated dial key for selecting one of the plurality of dial data corresponding to the key, and generating a call based on the selected data, and a selector circuit for setting a communication use mode of at least one dial data of the plurality of dial data.

12 Claims, 3 Drawing Sheets

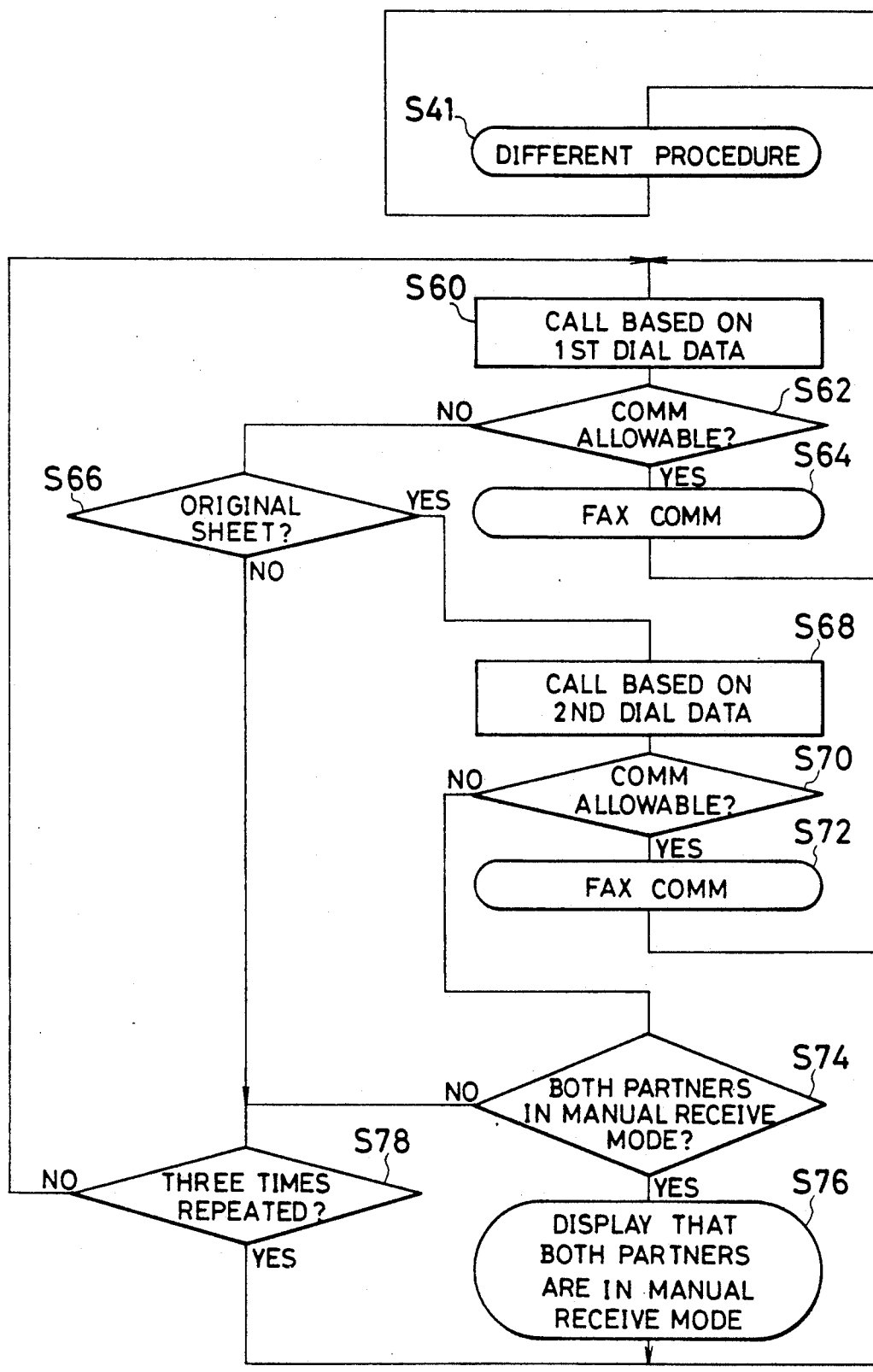

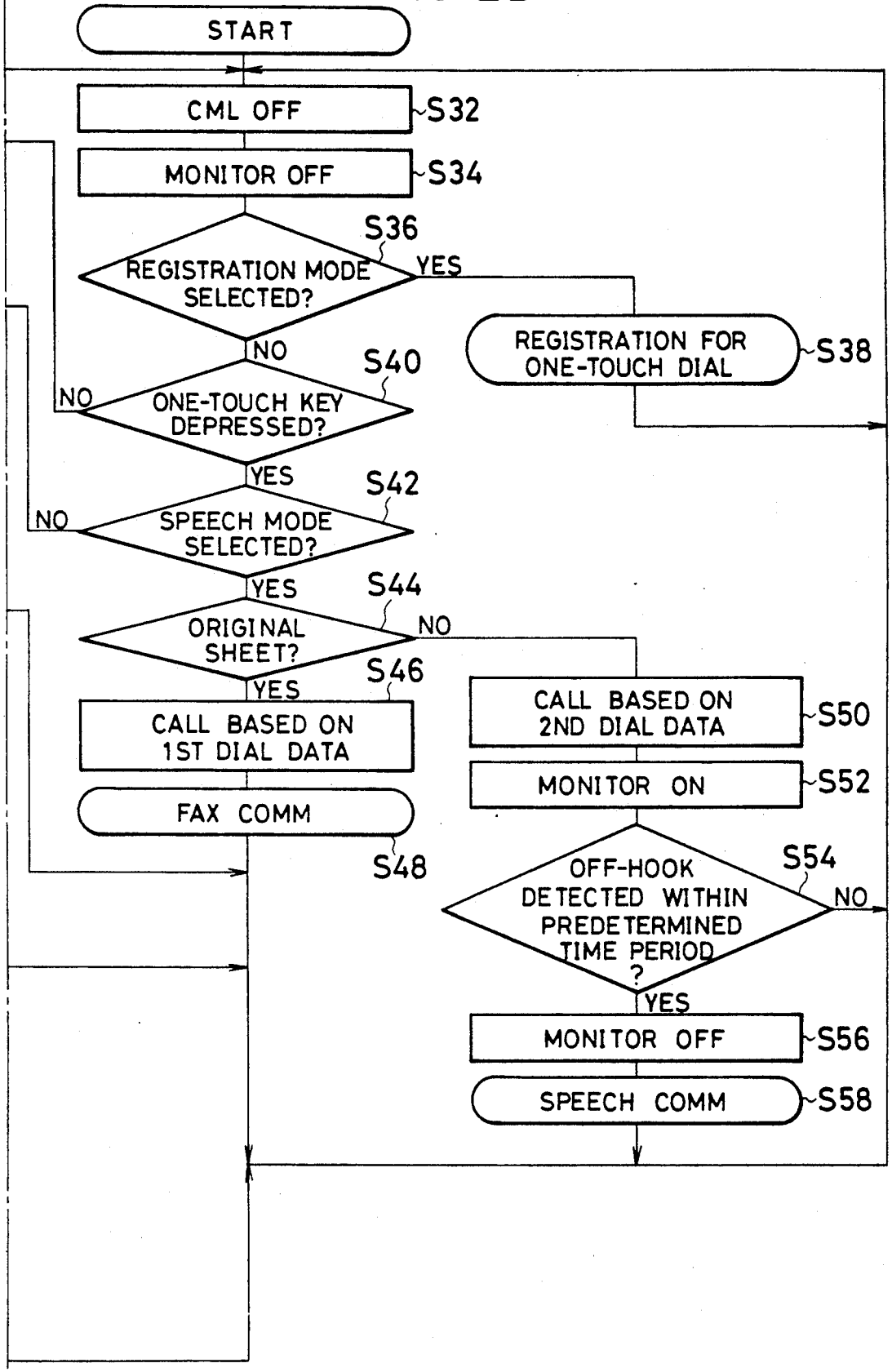

DATA COMMUNICATION APPARATUS WITH AN ABBREVIATED DIAL KEY HAVING A PLURALITY OF DIAL DATA AND CAPABLE OF SELECTING ONE OF TWO COMMUNICATION FUNCTIONS

This application is a continuation of application Ser. No. 07/550,953 filed Jul. 11, 1990 now abandoned.

BACKGROUND OF THE INVENTION

1. Field of the Invention

The present invention relates to a communication apparatus having an abbreviated dial function such as a one-touch dial key.

2. Related Background Art

Conventionally, a communication apparatus such as a facsimile apparatus which stores dial data of a desired destination station in correspondence with a specific abbreviated dial key operation or a one-touch key operation, and calls the destination station using the dial data stored in a memory in accordance with the operation of the abbreviated dial key or the one-touch dial key to perform communication, is known.

In some apparatuses of this type, two dial data (e.g., a telephone number) can be registered for one destination. In such an apparatus, however, the use modes of the two dial data are limited For example, two dial data are stored for a one-touch dial key, so that a telephone number of a destination facsimile apparatus is stored as the first dial data, and a telephone number of a destination telephone set is stored as the second dial data.

When the one-touch dial key is depressed while an original sheet is set, a call is generated using the first dial data, and facsimile communication is then performed. In this case, a call is generated for the purpose of performing a communication using the one-touch dial function. When the one-touch dial key is depressed while no original sheet is set, a call is generated using the second dial data, a speech signal of the destination station is monitored, and monitoring is interrupted upon off-hook, thus starting a speech communication. In this state, a call is generated for the purpose of performing a speech communication using the one-touch dial function. As applications associated with such a facsimile apparatus, U.S. Pat. Nos. 4,825,461 and 4,833,705 are known.

However, in the prior art, the use modes of two dial data registered for one destination are limited. For example, when a facsimile apparatus is used on a desk, such a function is very convenient. However, when a facsimile apparatus is equipped at a corner of a room to be commonly used by a plurality of users, the above-mentioned function is not so effective. That is, it is likely that a speech communication is performed using a telephone set on a desk but it is most unlikely that a user goes to a facsimile apparatus which is far from his desk to perform a speech communication.

In order to solve this problem, two one-touch keys are assigned to one destination, and speech and image communication dial data are respectively set in these keys. However, it is not effective as a method of using a limited number of one-touch keys.

The above problem is common to various communication apparatuses for controlling communications upon operations of predetermined abbreviated dial keys as well as one-touch keys.

SUMMARY OF THE INVENTION

It is an object of the present invention to improve a communication apparatus in consideration of the above-mentioned problem.

It is another object of the present invention to provide a communication apparatus which allows registration of a plurality of dial data for one abbreviated dial key, and can set a communication use mode of at least one dial data.

It is still another object of the present invention to provide a communication apparatus which allows registration of a plurality of dial data for one abbreviated dial key, and can realize an abbreviated dial function with a high degree of freedom.

The above and other objects of the present invention will be more apparent from the following description of the embodiment, and the accompanying drawings.

BRIEF DESCRIPTION OF THE DRAWINGS

FIGS. 2, 2A, 2B show a flow chart showing a control operation of a control circuit of this embodiment.

DETAILED DESCRIPTION OF THE PREFERRED EMBODIMENT

Figure 1:
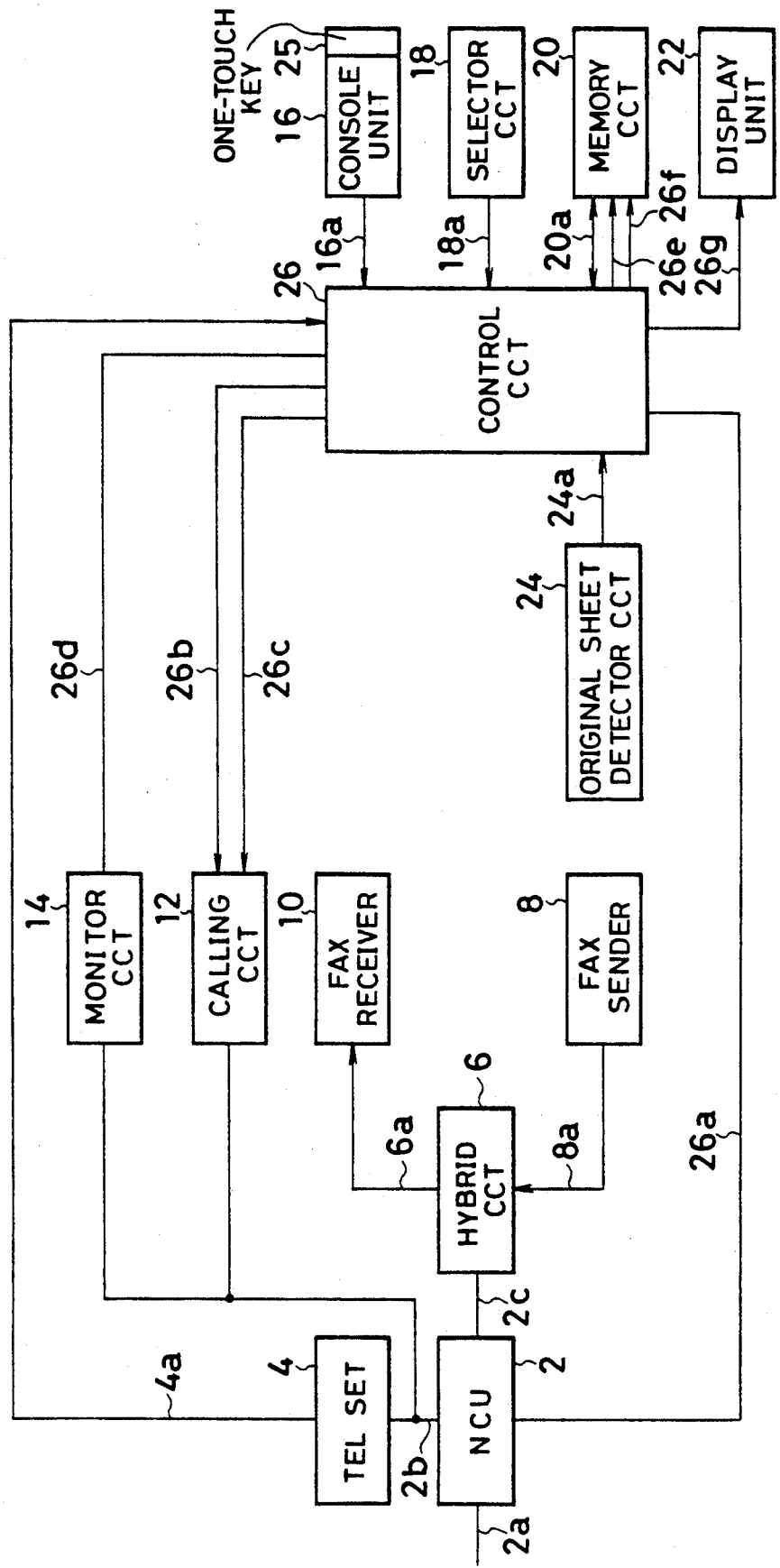
FIG. 1 is a block diagram showing an arrangement of a facsimile apparatus according to an embodiment of the present invention.

An embodiment of the present invention will be described in detail below with reference to the accompanying drawings.

In this embodiment, a facsimile apparatus will be exemplified. However, the present invention is not limited to a facsimile apparatus but may be applied to all the communication apparatuses having an abbreviated dial function such as a teletex or a telephone set.

FIG. 1 is a block diagram showing an arrangement of a facsimile apparatus of this embodiment.

In FIG. 1, a network control unit (NCU) 2 connects a telephone network to a terminal on the line to use it for a data communication, and performs connection control of a telephone exchange network, or switching to a data communication path, or holding of a loop.

A signal line 2a corresponds to a telephone line. The NCU 2 receives a signal on a signal line 26a, and if this signal has "0" level, it connects the telephone line to a telephone set side, i.e., connects the signal line 2a to a signal line 2b. Upon reception of the signal on the signal line 26a, if the received signal has "1" level, the NCU 2 connects the telephone line to a facsimile apparatus side, i.e., connects the signal line 2a to a signal line 2c. In a normal state, the telephone line 2a is connected to a telephone set 4 side for manual control or a speech communication by a CML relay in the NCU 2.

A hybrid circuit 6 separates transmission and reception signals. More specifically, a transmission signal on a signal line 8a propagates along the signal line 2c, and is sent onto the telephone line 2a via the NCU 2. A signal sent from a station on the other end of the line is input to the NCU 2, and is then output onto a signal line 6a via the signal line 2c.

A facsimile sender 8 comprises known circuits for image transmission, e.g., an image reader, an encoder, a modulator of a modem, and the like. A transmission signal from the facsimile sender 8 is input to the hybrid circuit 6 via the signal line 8a.

A facsimile receiver 10 comprises known circuits for image reception, e.g., an image recorder, a decoder, a demodulator of the modem, and the like.

In this embodiment, the arrangement and control of these image transmission and reception means are quite the same as those in the prior art, and a detailed description thereof will be omitted.

A calling circuit 12 generates a dial signal (e.g., dial pulses, a tone signal, or the like) adapted to a system of the line 2a. When a call instruction pulse is input from a signal line 26c, the calling circuit 12 generates a dial signal according to dial data input from a signal line 26b, and inputs it to the NCU 2.

A speech monitor circuit 14 monitors a speech signal. The monitor circuit 14 outputs a speech signal on the line via a loudspeaker or the like. The monitor operation of the speech monitor circuit 14 is enabled when a signal line 26d is set at signal level "1", and is disabled when it is set at signal level "0".

A console unit 16 comprises a keyboard including a ten-key pad, function keys, and the like. Key depression data on the keyboard is input to a control circuit 26 via a signal line 16a.

The console unit 16 has one-touch keys 25 including ten to several tens of keys. Depression data of these keys are also input to the control circuit 26. In this embodiment, two telephone numbers can be registered for one one-touch key 25.

A selector circuit 18 selects one of "substitute destination transmission" and "speech communication" functions for the second telephone number registered in a one-touch key 25 according to an operation state of key switches arranged on, e.g., the console unit 16 in association with the one-touch key 25. A "substitute destination" means another (second) telephone number of an identical destination station. When a facsimile apparatus of a destination station corresponding to the first telephone number cannot perform image reception, the apparatus of this embodiment performs transmission to the substitute destination.

A selection state of a use of a telephone number is output to the control circuit 26 via a signal line 18a. When the "substitute destination transmission" function is selected, the signal line 18a is controlled to signal level "1". When the "speech communication" function is selected, the signal line 18a is controlled to signal level "0".

A memory circuit 20 stores two telephone numbers for each one-touch key 25, and comprises, e.g., a RAM.

When dial data is stored in the memory circuit 20, a number of a one-touch key 25 (e.g., "01"), "*", a first telephone number, "*", and a second telephone number are input onto a signal line 20a by character codes, or the like, and a write pulse is generated onto a signal line 26e, thus writing these data in the memory circuit 20.

When dial data stored in the memory circuit 20 is read out, a number of a one-touch key 25 is input onto the signal line 20a, and a read pulse is input onto a signal line 26f, thus outputting two telephone numbers expressed by character codes o the like onto the signal line 20a while being divided by "*".

A display unit 22 comprises, e.g., a liquid crystal display, and is used for displaying time and an operation state and for monitoring input data upon registration of telephone numbers.

An original sheet detector circuit 24 comprises, e.g., a photosensor, and detects for communication control (to be described later) whether or not an original sheet is loaded on the original reader of the facsimile sender 8. When an original sheet is loaded, the original sheet detector circuit 24 sets a signal line 24a at signal level "1"; otherwise, it sets the signal line 24a at signal level "0".

The control circuit 26 comprises a microprocessor, a timer, and the like, and controls the operation of the entire apparatus constituted by the above-mentioned units. A control program for the control circuit 26 is stored in a ROM 26r.

The operation of the arrangement described above will be briefly described below.

In this embodiment, as a use of the second telephone number stored in the memory circuit 20 in association with the one-touch key 25, one of the "speech communication" and "substitute destination reception" functions can be selected.

These functions can be switched for all the one-touch keys 25 upon setup of the selector circuit 18.

A case will be described below wherein the "speech communication" function is selected by the selector circuit 18 as a use of the second dial data. An operator registers a telephone number of a destination facsimile apparatus as the first dial data of a one-touch key 25, and registers a telephone number of a destination telephone set as the second dial data.

When one of the one-touch keys 25 is depressed while the original sheet detector circuit 24 detects that an original sheet is loaded, a call is generated using the first dial data stored in the memory circuit 20 in association with the depressed one-touch dial key 25, and a facsimile communication is then started. In this operation, a call is generated for the purpose of a communication using the one-touch key dial function.

When one of the one-touch keys 25 is depressed while the original sheet detector circuit 24 does not detect an original sheet, a call is generated using the second dial data stored in the memory circuit 20 in association with the depressed one-touch key 25, a speech signal from a destination station is monitored using the speech monitor circuit 14, and a monitoring operation is interrupted upon off-hook of the telephone set 4, thus starting a speech communication using the telephone set 4. In this operation, a call is generated for the purpose of a speech communication using the one-touch key dial function.

A case will be described below wherein the "substitute destination transmission" function is selected as a use of the second dial data by the selector circuit 18.

An operator registers a telephone number of a destination facsimile apparatus as the first dial data of a one-touch key 25, and registers, as the second dial data, a telephone number of a nearby facsimile apparatus to which data is alternatively transmitted when the facsimile apparatus designated by the first dial data is busy.

When a one-touch key 25 is depressed while an original sheet is set, a call is generated using the first dial data, and a facsimile communication is then started unless a destination station is busy or cannot receive the incoming call. When the call is generated based on the first dial data, if the destination station is busy or cannot automatically receive the incoming call, a call is generated based on the second dial data stored in the memory circuit 20 in association with the corresponding one-touch key 25.

A facsimile communication is then started if it is possible. However, when the destination facsimile apparatus is busy, a call is generated again based on the first dial data stored in the memory circuit 20 in association with the one-touch key 25. This operation is repeated a predetermined number of times.

When no response is made for both the first and second dial data, a message indicating this is displayed. When no original sheet is set, a call is generated based on only the first dial data, and polling reception is performed.

The above-mentioned communication control will be described in detail below with reference to FIG. 2.

FIG. 2 is a flow chart of a control sequence by the control circuit shown in FIG. 1. The sequence shown in-FIG. 2 is stored in the ROM 26r.

According to a power-on operation, or the like, the control circuit 26 outputs a signal of signal level "0" onto the signal line 26a in step S32, thereby turning off the CML relay of the NCU 2, and connecting the line 2a to the telephone set 4 side.

In step S34, the control circuit outputs a signal of signal level "0" onto the signal line 26d, thus inhibiting a speech monitoring operation by the monitor circuit 14.

In step S36, the control circuit receives a signal from the console unit (signal output onto the signal line 16a), and checks if a registration mode of a telephone number associated with the one-touch keys 25 is selected. If YES in step S36, the flow advances to step S38, and the control circuit executes registration processing of a telephone number in the memory circuit 20 via the lines 20a, 26e, and 26f. An operation method and an edit method using the console unit 16, the one-touch keys 25, and the display unit 22 are known to those who are skilled in the art. In this case, two telephone numbers (or at least one telephone number) are registered for one one-touch key 25.

If NO in step S36, the flow advances to step S40.

In step S40, the control circuit receives a signal from the console unit, and checks if a one-touch key 25 is depressed. If NO in step S40, a different procedure is executed in step S41, and the flow returns to step S32. If YES in step S40, the flow advances to step S42.

It is checked based on a signal on the signal line 18a in step S42 if the "speech communication" mode is selected as a use mode of the second dial data stored in the memory circuit 20 in association with the one-touch key 25.

If it is determined in step S42 that the "speech communication" mode is selected, i.e., a signal of signal level "0" is output onto the signal line 18a, the flow advances to step S44. However, if it is determined in step S42 that the "substitute destination transmission" mode is selected, i.e., a signal of signal level "1" is output onto the signal line 18a, the flow advances to step S60.

In step S44, the control circuit receives a signal on the signal line 24a, and checks if an original sheet is set. When the original sheet detector circuit 24 detects that an original sheet is loaded, the control circuit outputs the first dial data stored in the memory circuit 20 in association with the one-touch key 25 onto the signal line 26b, and then generates a call instruction pulse onto the signal line 26c, thus generating a call based on the first dial data (step S46). In step S48, a facsimile communication is started.

If NO in step S44, the control circuit outputs the second dial data stored in the memory circuit 20 in association with the one-touch key 25 onto the signal line 26b, and then generates a call instruction pulse onto the signal line 26c, thus generating a call based on the second dial data (step S50). The control circuit then outputs a signal of signal level "1" onto the signal line 26d to enable the speech monitor circuit 14 (step S52).

In step S54, it is checked (based on a signal on the signal line 4a) if the telephone set 4 is set in an off-hook state within a predetermined period of time (e.g., 30 sec). If YES in step S54, the control circuit outputs a signal of signal level "0" onto the signal line 26d in step S56 to disable the speech monitor circuit 14, and a speech communication using the telephone set 4 is started in step S58. If NO in step S54, the flow advances to step S32.

In step S60, the control circuit outputs the first dial data stored in the memory circuit 20 in association with the one-touch key 25 onto the signal line 26b, and then generates a call instruction pulse onto the signal line 26c, thus generating a call based on the first dial data.

In step S62, it is checked if a communication allowable state is set. If YES in step S62, a facsimile communication is started in step S64. If NO in step S62, the flow advances to step S66.

In step S66, the control circuit receives a signal on the signal line 24a, and checks if there is an original sheet. If YES in step S66, the flow advances to step S68; otherwise, polling reception is to be executed. However, polling reception from a substitute destination is non-sense, and the flow advances to step S78.

In step S68, the control circuit outputs the second dial data stored in the memory circuit 20 in association with the one-touch key 25 onto the signal line 26b, and then generates a call instruction pulse onto the signal line 26c, thus generating a call based on the second dial data.

In step S70, it is checked if a communication allowable state is set. If YES in step S70, a facsimile communication is started in step S72. If NO in step S70, the flow advances to step S74.

It is checked in step S74 if neither of the destination stations (partners) designated by the first and second dial data are busy and neither of them respond, i.e., these stations are set in a manual receive mode. If YES in step S74, the flow advances to step S76 to display a message indicating this. If it is determined in step S74 that one of the destination stations designated by the first and second dial data is not set in the manual receive mode, the flow advances to step S78.

It is checked in step S78 if this step has been repeated three times. If YES in step S78, a message indicating this is displayed, and the flow then advances to step S32. If NO in step S78, the flow advances to step S60.

According to the above-mentioned sequence, when a call is generated using the one-touch key 25, a use mode of a second one of the two dial data stored in the memory circuit 20 in association with the one-touch key 25 can be switched between "speech communication" and "substitute destination transmission" modes according to selection of the selector circuit 18. When the "speech communication" mode is selected as the use, a communication or speech communication is automatically selected depending on the presence/absence of an original sheet like in the prior art described above.

In the "substitute destination transmission" mode, if a station called based on the first dial data cannot perform a communication, a call is generated based on the second dial data, and an image can be transmitted to a different terminal of the same destination station. Thus, if one terminal of a destination station cannot perform a communication for an extended period of time, image data can be transmitted as soon as possible.

In the above embodiment, the selector circuit 18 can switch the use mode of the second dial data stored in the memory circuit 20 in association with all the one-touch keys 25. However, the use mode of the second telephone number of each one-touch key may be controlled in units of one-touch keys. Since this control data must be set in units of one-touch keys, a control flag or the like may be set upon registration of the one-touch dial data.

In the above embodiment, two dial data are registered. However, three or more dial data may be registered. For example, three dial data are registered for each one-touch dial key, such that a destination facsimile number is stored as the first dial data, a destination telephone number is stored as the second dial data, and a substitute destination transmission number is registered as the third dial data. In this case, if an original sheet is set, a call is generated based on the destination facsimile number. If a terminal designated by the destination facsimile number is busy, a call is generated based on the substitute destination transmission number. If there is no original sheet, a call is generated based on the destination telephone number.

The above-mentioned technique can be applied to communication apparatuses other than a facsimile apparatus. The same control can be made in an apparatus which generates a call using dial data other than a telephone number. An abbreviated dial system is not limited to a one-touch key system, and the same control may be made as long as one operation means or method is assigned to a certain destination station.

The present invention is not limited to the above embodiment, and various other changes and modifications may be made within the spirit and scope of the invention.

What is claimed is:

1. A communication apparatus having a first communication mode and a second communication mode, comprising:
    an abbreviated dial key;
    a memory for storing first dial data and second dial data in correspondence with said abbreviated dial key;
    setting means for setting at least one of the first and second dial data to be identified as dial data for the first or second communication mode;
    detection means for detecting when communication data is present to provide a detection signal at a first value, said detection means further detecting when communication data is not present to provide the detection signal at a second value; and
    control means responsive to key input of the abbreviated dial key for selecting one of the first and second dial data to generate a call based on the selected dial data, and for selecting one of the first and second communication modes in accordance with the setting by said setting means and the detection signal of said detection means.

2. An apparatus according to claim 1, wherein said first communication mode is for effecting data communication and said second communication mode is for effecting speech communication by a telephone set.

3. An apparatus according to claim 2, wherein said setting means is capable of setting second dial data to be identified as dial data for the second communication mode.

4. An apparatus according to claim 1, wherein said abbreviated dial key comprises an one-touch dial key.

5. A communication apparatus having a speech communication mode and a data communication mode, comprising:
    a console unit including an abbreviated dial key;
    a memory for storing first dial data and second dial data in correspondence with the abbreviated dial key;
    a selector circuit for setting at least one of the first and second dial data to be identified as dial data for the speech communication mode or dial data for the data communication mode;
    a detection circuit for detecting when data for data communication is present to provide a detection signal at a first value, said detection means further detecting when data for data communication is not present to provide the detection signal at a second value;
    a control circuit responsive to key input of the abbreviated dial key for selecting one of the first and second dial data and reading out the dial data from the memory, and for selecting one of the speech communication mode and the data communication mode; and
    a calling circuit for generating a call according to the dial data from the control circuit;
    wherein said control circuit selects one of said first and second dial data and selects the data communication mode in accordance with the setting by said selector circuit and the detection signal of said detection circuit.

6. An apparatus according to claim 5, wherein said abbreviated dial key comprises an one-touch dial key.

7. An apparatus according to claim 5, wherein said selector circuit is capable of setting the second dial data to be identified as dial data for the speech communication mode.

8. An apparatus according to claim 5, wherein when the second dial data is set as dial data for the data communication by said selector circuit, said control circuit sends the first dial data to said calling circuit in response to the key input, but if a line is not connected to a destination station called by said calling circuit, said control circuit sends the second dial data to said calling circuit.

9. A calling method using an abbreviated dial key, comprising the steps of:
    registering first dial data and second dial data in correspondence with one abbreviated dial key;
    setting one of the first and second dial data to be identified as dial data for speech communication or dial data for data communication;
    detecting when data for data communication is present to provide a detection signal at a first value, said detection means further detecting when data for data communication is not present to provide the detection signal at a second value;
    selecting one of the first and second dial data in response to the actuation of the abbreviated dial key to call a destination in accordance with the setting in said setting step and the detection signal in said detecting step; and
    effecting the speech communication or the data communication in accordance with the setting in said setting step and the detection signal in said detecting step.

10. A method according to claim 9, wherein when the second dial data is set as dial data for the data communication, the first dial data is selected to call a destination, but if a line is not connected to the called destination, the second dial data is selected to call the destination.

11. A communication apparatus having a speech communication mode and a data communication mode, comprising:

an abbreviated dial key;

a memory for storing first dial data and second dial data in correspondence with the abbreviated dial key;

selector means for selecting (1) the setting of both the first dial data and the second dial data as dial data for data communication, or (2) the setting of the first dial data as dial data for the data communication and the second dial data as dial data for speech communication;

detector means for detecting when data for data communication is present to provide a detection signal at a first value, said detection means further detecting when data for data communication is not present to provide the detection signal at a second value; and control means for selecting one of the first and second dial data in response to key input of the abbreviated dial key to generate a call based on the selected dial data, and for performing communication control;

said control means selecting the dial data and performing the communication control in accordance with the selection by said selector means and the detection signal by said detector means.

12. An apparatus according to claim 11, wherein when the first and second dial data are set as dial data for the data communication, said control means selects the first dial data in response to the key input to call a destination, but if a line is not connected to the destination, said control means calls a destination on the basis of the second dial data.

* * * * *